Patented Sept. 23, 1947

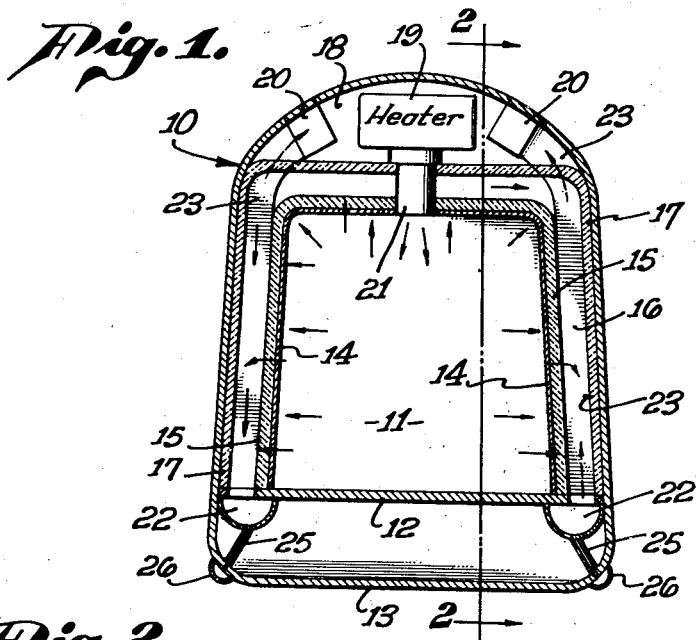
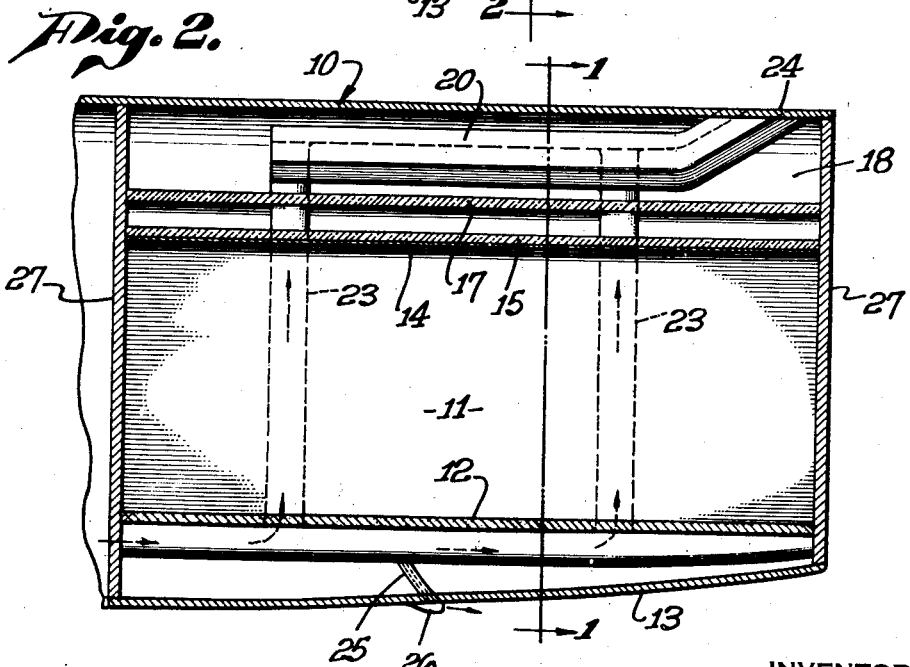

2,427,698

UNITED STATES PATENT OFFICE 2,427,698

INSULATING AND VENTILATING STRUCTURE

Albert A. Arnhym, Los Angeles, Calif., assignor to Solar Aircraft Company, San Diego, Calif., a corporation of California Application April 28, 1944, Serial No. 533,207

5 Claims. (Cl. 98—33)

This invention relates broadly to wall structures for providing thermal or acoustic insulation for rooms, compartments and the like, and is particularly useful in heated cabins of aircraft.

In order to make aeroplane travel comfortable, it is essential that the walls of the passenger compartment or cabin be acoustically insulated to keep out the deafening noise of the engines and propellers. Thermal insulation is also highly desirable, and wall structures providing both acoustic and thermal insulation have been used. However, to the best of my knowledge, all prior known structures that have been tried had the serious objection of absorbing and retaining moisture from the air, which moisture is very deleterious, not only because it may be destructive of and reduce the insulating efficiency of the material in which it accumulates, but because it adds weight to the aeroplane.

Attempts have been made to prevent entry of moisture into the insulating walls by sealing the surfaces of the walls. Unfortunately a sealed surface usually has poor acoustic absorption and it is very difficult to get a surface seal that is really effective in keeping out moisture. Furthermore, although the seal may be ineffective in preventing ingress of moisture under conditions of high humidity, it is usually undesirably effective in preventing escape of the moisture when the humidity of the air is reduced. The result is a gradual building up of the moisture content over a period of time until it becomes objectionably high.

An object of the invention is to provide an insulating wall structure that will remain in relatively dry condition over a long period of time.

Another object is to provide a structure that can readily and quickly give up accumulated moisture when subsequently exposed to air of low humidity.

Another object is to provide a wall structure for a heated chamber in which the thermal efficiency of the structure as a whole is relatively high.

Another object is to provide a wall structure for the cabins of aircraft that facilitates ventilation without the creation of disturbing drafts or stratified layers of cold and hot air within the cabin.

Still another object is to provide an insulated wall structure for the cabins of aircraft and the like in which condensation within the wall is disposed of and exhaust ventilating air is efficiently removed.

Other more specific objects and features of the invention will appear from the detailed description to follow with reference to the drawing.

Essentially, the present invention comprises separate inner and outer walls for the chamber to be insulated, which walls define therebetween a passage for escape of exhaust ventilation air to a suitable exhaust duct in which the inner wall is permeable to air, and circulation through the inner wall over substantially its entire area is produced by maintaining a pressure drop between the interior of the chamber and the exhaust duct. This arrangement facilitates the acoustic insulation of the chamber because airpermeable inner wall materials having high acoustic absorption properties are readily available. Such permeable inner wall materials are permissible with the construction of the present invention because the constant circulation of exhaust ventilating air from the chamber through the wall tends to maintain the inner wall at a temperature above the dew point of the air, thereby preventing condensation. Furthermore, even should moisture be condensed in the inner wall during a period of extreme humidity, such condensation is quickly evaporated by the flow of air through the wall when the humidity subsequently drops to a lower value.

Since the warm air passing from the interior of the cabin through the inner wall is in intimate heat transfer relation to the inner wall structure, it transfers substantial heat thereto, compensating for the heat that is naturally lost by radiation from the inner wall to the outer wall. Such radiation is very appreciable because of the fact that, despite insulation, the outer wall of an aeroplane cabin is very strongly cooled by the outside air when the temperature of the latter is low. The overall result is that with the present invention, a substantial part of the heat content of the exhaust ventilation air is transferred by conduction to the cabin wall itself instead of being completely lost with the exhaust air. In effect, the porous inner wall is an efficient heat transfer device for abstracting useful heat from the exhaust air before it is vented to the exterior.

In the drawing:

Fig. 1 is a schematic cross section showing an aeroplane cabin having a ventilating wall structure in accordance with the invention as seen on line 1—1 of Fig. 2; and Fig. 2 is a longitudinal section taken substantially in the plane 2—2 of Fig. 1.

Referring to the drawings, there is shown an outer wall 10 which may be the outer metal skin of an aeroplane fuselage and forms a lateral enclosure for a passenger compartment or cabin 11. The fore and aft enclosures for the cabin 11 may be constituted by bulkheads 27 extending across the fuselage. These bulkheads may be of any known construction and while they may be of hollow construction similar to the lateral hollow wall construction to be described, that is not essential since the walls of the bulkhead exterior to the cabin 11 are not exposed to the air stream exterior of the fuselage as is the wall 11. Hence for the purpose of the present invention, the fore and aft walls 27 can be constructed of single layers of insulating wall material as shown in Fig. 2.

The inner walls of the cabin 11 include a floor 12 which is shown spaced a substantial distance from the bottom wall 13 of the fuselage but need not necessarily be spaced greatly therefrom. The side and top walls of the chamber 11 are shown continuous in Fig. 1 and consist of a layer 15. Spaced outwardly from the layer 15 and defining therewith an air space 16 is a thermal insulating layer 17 which is shown positioned against the fuselage 10 at the sides but spaced therefrom at the top to provide a space 18 for the location of a heater 19 and exhaust ducts 20.

The heater 19 may be of any desired type and receives air from the space 18 and discharges it through a duct 21 into the cabin 11. From the duct 21 the air is distributed throughout the cabin 11 and exhausted therefrom through the inner wall into the space 16, down through the space 16 to the troughs 22 extending longitudinally therebelow, and thence into risers 23 through which it flows upwardly into the ducts 20. The latter communicate at one end with orifices 24 in the fuselage 10 located at points of negative pressure thereon. The space 18 in which the heater 19 is positioned may be supplied with air at positive pressure either by a blower or by a scoop located on the exterior of the fuselage or by a duct terminating at a point of positive pressure on the fuselage, so that there is a pressure drop between the space 18 and the orifices 24 to promote constant circulation of air through the inner wall of the cabin, as described.

During much of the time when an aeroplane is in flight, it is passing through air at relatively low temperatures, and the skin 10 of the aeroplane requires a temperature substantially the same as that of the air stream and markedly below the temperature of the air within the cabin 11. Furthermore, because of the exhalation of moisture by occupants of the cabin and/or the moisture that may be supplied by the heater 19, the absolute moisture content of the air within the cabin may be such that its dew point is much higher than the temperature of the fuselage 10. However, by virtue of the insulating layer 17, the conduction of heat from the inner surface of the layer 17 to the skin 10 may be reduced to the point where little condensation occurs from the air in the space 16 to the layer 17. It is conceivable, however, that under very adverse conditions involving extremely low outside temperatures and relatively high humidity of the cabin air, some moisture may condense on the inner surface of the layer 17 and even in the layer 15. Such moisture will gravitate into the troughs 22, and I provide for the immediate elimination of such condensed water by drainage ducts 25 leading from the bottoms of the troughs 22 to small spills 26 on the outer surface of the fuselage 10. The spills 26 which face rearwardly with reference to the direction of flight provide the necessary negative pressure to draw condensed water out through the ducts 25 despite the fact that the lower portion of the fuselage may be at a static pressure that is positive. Because of the fact that the volume of water that it is necessary to exhaust through the spills 26 is relatively small, the spills 26 can be so small that they do not appreciably increase the air resistance of the aeroplane.

It is possible to make these spills 26 small because of the fact that they do not have to handle the exhaust air, the latter being discharged from the troughs 22 upwardly through the ducts 23 into the ducts 20 and thence out through the orifices 24 located at points of negative pressure on the fuselage.

Various materials can be employed for the walls 15 and 17. As examples, the wall may be a commercial insulating material known as "Kwilko" which is a kapok bat sewn between cheese cloth. The wall 17 may be a felted product such as "K" felt, mica or a similar substance. The inner surface of the wall 15 may be covered with a lining of porous cloth 14.

Various departures from the specific structure shown can be made without departing from the invention which is to be limited only to the extent set forth in the appended claims.

I claim:

1. An insulated and ventilated chamber construction for aircraft, comprising: means including the skin of the aeroplane constituting an outer wall means enclosing and defining said chamber; air-permeable inner wall means spaced from and coextensive with at least a major part of the side and top portions of said outer wall means and defining therewith an exhaust passage for ventilating air, at least a portion of said exhaust passage being juxtaposed to a side wall of said chamber; channel means at the bottom of said exhaust passage for collecting exhaust air and moisture from said exhaust passage; relatively large air duct means extending from said channel upwardly and terminating at a discharge orifice in the skin of the aircraft at a point of negative pressure thereon; and means for supplying air into said chamber at a pressure above the pressure at said discharge orifice.

2. An insulated and ventilated chamber construction comprising: inner wall means enclosing and defining said chamber; outer wall means spaced from and coextensive with at least a major part of said inner wall means, said inner and outer wall means defining therebetween an exhaust passage for ventilating air, which exhaust passage includes an approximately vertical portion lying between side wall portions of said inner and outer wall means; means for supplying ventilating air to said chamber; and means for exhausting air from said exhaust passage; in which said major part of said inner wall means is porous and permeable, whereby air circulates from said chamber through said inner wall means to said exhaust passage over substantially the entire area of said major part of said inner wall means; means defining a channel extending along the bottom of said approximately vertical portion of said exhaust passage for collecting water condensed from said air; and means for discharging water from said channel.

3. A construction as described in claim 2 in which said means for exhausting air includes duct means separate from said water discharging means.

4. A construction as described in claim 2 in which said means for exhausting air includes duct means separate from and of relatively large flow capacity compared to said water discharging means.

5. An insulated and ventilated chamber construction for aircraft, comprising: means including the skin of the aircraft constituting an outer wall means enclosing and defining said chamber; air-permeable inner wall means spaced from and coextensive with at least a part of said outer wall means and defining therewith an exhaust passage for ventilating air, at least a portion of said exhaust passage being juxtaposed to a side wall of said chamber; channel means at the bottom of said exhaust passage for collecting exhaust air and moisture from said exhaust passage; relatively large air duct means extending from said channel upwardly and terminating at a discharge orifice in the skin of the aircraft at a point of negative pressure thereon; means for supplying air into said chamber at a pressure above the pressure at said discharge orifice; a small duct for the discharge of water extending downwardly from said channel to a point on the under surface of the aircraft at a point of positive pressure thereon; and baffle means on said aircraft adjacent said water duct for establishing suction in said duct in response to the air-stream therepast.

ALBERT A. ARNHYM.

REFERENCES CITED

The following references are of record in the file of this patent:

UNITED STATES PATENTS

| Number | Name | Date |
|---|---|---|
| 2,160,066 | Frische | May 30, 1939 |
| 2,063,477 | Young et al. | Dec. 8, 1936 |
| 2,265,623 | Bonsall | Dec. 9, 1941 |
| 2,291,220 | Germonprez | July 28, 1942 |
| 2,027,315 | Higgins | Jan. 7, 1936 |
| 2,263,919 | Darragh, Jr. | Nov. 25, 1941 |
| 1,563,042 | Roney | Nov. 24, 1925 |
| 2,171,622 | Calkins | Sept. 5, 1939 |
| 2,172,944 | Norris | Sept. 12, 1939 |